United States Patent [19]
Kosako

[11] Patent Number: 5,463,438
[45] Date of Patent: Oct. 31, 1995

[54] PARALLAX CORRECTING MECHANISM OF A ZOOM FINDER OF A CAMERA

[75] Inventor: Kosei Kosako, Tokyo, Japan

[73] Assignee: Asahi Kogaku Kogyo Kabushiki Kaisha, Tokyo, Japan

[21] Appl. No.: 330,617

[22] Filed: Oct. 28, 1994

Related U.S. Application Data

[63] Continuation of Ser. No. 151,147, Nov. 12, 1993, abandoned.

[30] Foreign Application Priority Data

Jan. 18, 1993 [JP] Japan .................... 5-000920 U

[51] Int. Cl.⁶ .................................. G03B 13/14
[52] U.S. Cl. .................................. 354/221
[58] Field of Search .................. 354/199, 219, 354/221, 222, 195.1, 195.12; 359/693, 703

[56] References Cited

U.S. PATENT DOCUMENTS 4,887,109  12/1989  Fujita et al. ................. 354/222
4,944,030  7/1990   Haraguchi et al. ........... 354/222 X
5,266,992  11/1993  Takaoka et al. ............. 354/199

*Primary Examiner*—Russell E. Adams
*Assistant Examiner*—J. K. Han
*Attorney, Agent, or Firm*—Sandler, Greenblum & Bernstein

[57] ABSTRACT

A zoom finder of a camera including a variable power zoom finder optical system and a parallax error compensating optical member that is rotatable between a retracted position and a parallax error compensating position in which the parallax error compensating optical member is in the optical path of the finder. Upon transfer to a macro mode, the parallax error compensating optical member is rotated to the compensating position from the retracted position. The finder is further provided with a snap-action mechanism, wherein an immediate rotation of the parallax error compensating optical member occurs between the compensating position and the retracted position when the parallax error compensating optical member moves beyond a point of instability of the snap-action mechanism in a direction of the compensating position and the retracted position, respectively.

21 Claims, 10 Drawing Sheets

PARALLAX CORRECTING MECHANISM OF A ZOOM FINDER OF A CAMERA

This application is a continuation of application Ser. No. 08/151,147, filed Nov. 12, 1993, now abandoned.

BACKGROUND OF THE INVENTION

1. Field of the Invention

The present invention relates to a zoom finder of a camera. More precisely, the invention relates to a zoom finder in which a parallax error between the zoom finder optical system and a zoom photographing optical system occurs upon transfer to a macro mode.

2. Description of Related Art

In a lens shutter type camera having a macro mode for macrophotographing in addition to a standard mode for ordinary zoom photographing in which the selection of the mode is effected by a selection switch, it is known to provide a parallax error compensating optical member which is retractably moved into an optical path of a zoom finder optical system to compensate for parallax error that occurs between a zoom photographing optical system and the zoom finder optical system when the mode is switched to the macro mode.

In the above-described lens shutter type camera, the parallax error compensating optical member is actuated by a mechanism that is guided by a cam groove provided on a cam plate. The cam plate is moved in opposite directions, for example, in association with the movement of the zoom photographing optical system. Accordingly, the parallax error compensating optical member is moved in accordance with the cam groove.

The rotation of the parallax error compensating optical member, which is moved along the cam groove to come into and out of the optical path of the zoom finder optical system occurs at a slower rate than the mode switching operation. Thus, the rotating parallax error compensating optical member is conspicuous within the zoom finder and disruptive to the photographer. Furthermore, the known actuating mechanism of the parallax error compensating optical member using the cam plate includes a large number of components which complicates the mechanism.

SUMMARY OF THE INVENTION

It is an object of the present invention to provide a simple zoom finder having few components, wherein a quick movement of a parallax error compensating optical member minimizes the visibility of the member within the zoom finder when the photographing mode is switched. With this arrangement the photographer is not disrupted during a photographing operation.

To achieve the object mentioned above, according to the present invention, a zoom finder of a camera is provided with a variable power zoom finder optical system and a parallax error compensating optical member which is rotatable between a retracted position in which the parallax error compensating optical member is retracted from an optical path and a compensating position in which the parallax error compensating optical member is in the optical path. Upon transfer to a macro mode, the parallax error compensating optical member is rotated to the compensating position from the retracted position. The zoom finder is further provided with a snap-action mechanism, so that an immediate rotation of the parallax error compensating optical member occurs between the compensating position and the retracted position The quick relation of the parallax error compensating optical member occurs when it moves beyond a point of instability of the snap-action mechanism in a direction of the compensating position and the retracted position, respectively.

Preferably, a cam plate which is movable in opposite directions is provided with a switching member which engages with the parallax error compensating optical member to effect the snap-action. The snap-action mechanism is effected when the switching member engages and releases the parallax error compensating optical member during movement of the cam plate. The switching member can be a switching pawl integrally formed on the cam plate, for example, by press machining.

In an embodiment, the parallax error compensating optical member is a prism.

A holder or frame is also provided which supports the parallax error compensating optical member to rotate between the compensating position and the retracted position.

Preferably, the frame is provided with a pair of engaging fingers which are located on a locus of movement of the switching member, so that the engaging fingers will engage with the switching member when the cam is moved back and forth.

It is possible to provide a finder body in which the parallax error compensating optical member and other components are housed.

The snap-action mechanism can be provided with a torsion spring which is engaged at opposite ends thereof with first and second spring engaging Projections provided on the finder body and the parallax error compensating optical member, respectively.

Preferably, the parallax error compensating optical member constitutes a diaphragm for the optical path of the zoom finder optical system when the parallax error compensating optical member is in the retracted position.

BRIEF DESCRIPTION OF THE DRAWINGS

The invention will be described below in detail with reference to the accompanying drawings, in which.

DESCRIPTION OF THE PREFERRED EMBODIMENT

Figure 10:
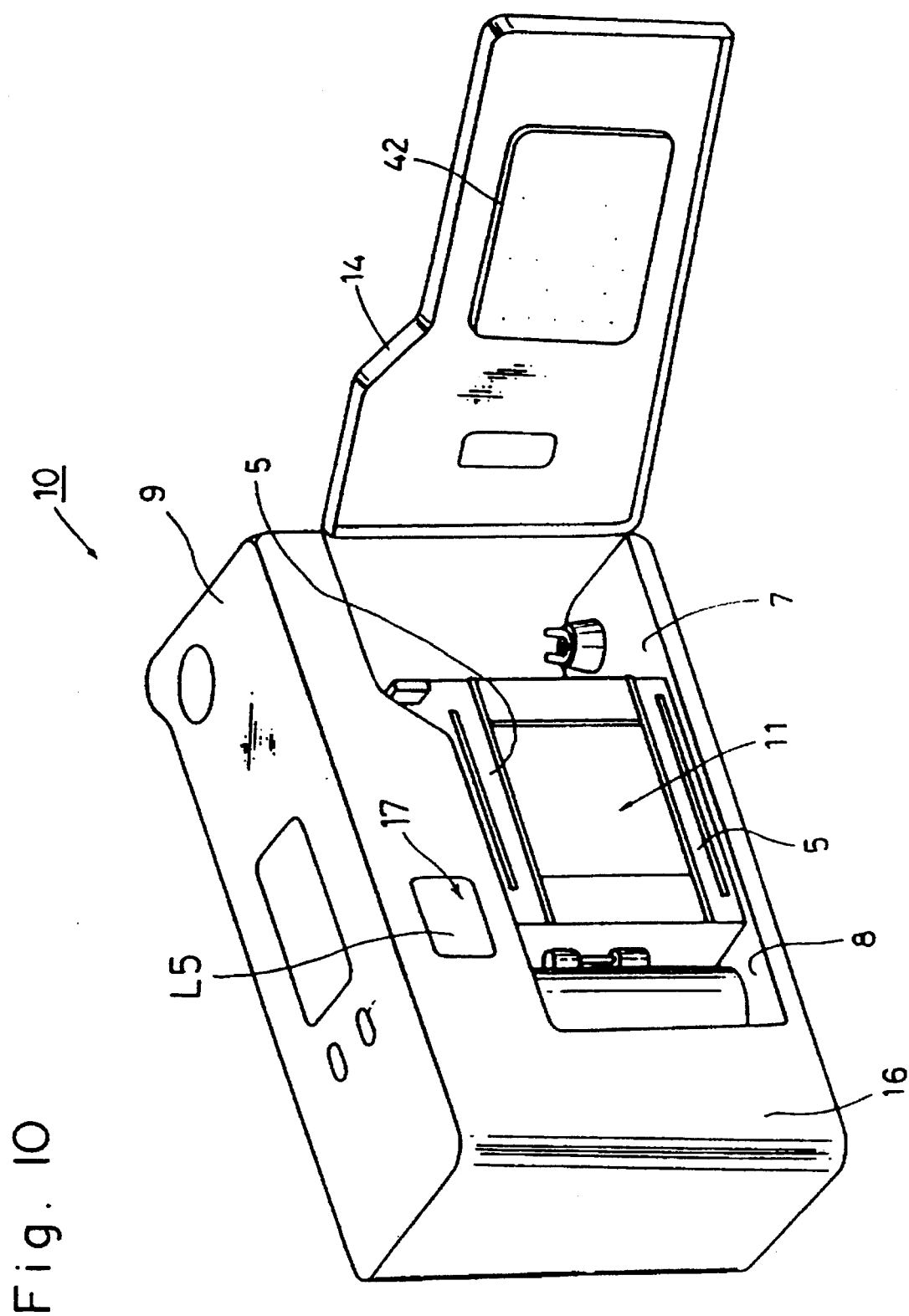
FIG. 10 is a rear isometric view of a camera to which the present invention is applied.

First, referring to FIG. 10, a lens shutter type camera 10 to which the present invention is applied will be discussed below.

The camera 10 has a camera body 9 in which a zoom photographing optical system (not shown) and a zoom finder optical system (FIG. 2) are provided. The camera body 9 is provided with a film compartment 7 and a film winding chamber 8 on right and left sides of the camera body. A photographing aperture 11 defined by upper and lower aperture frames 5 is provided between the film compartment 7 and the film winding chamber 8. A back cover 14 having a film keeping plate 42 is hinged to one end of a rear wall 16 of the camera body 9 to open and close the photographing aperture 11. The camera body 9 is provided, on the upper and middle portion of the rear wall 16 thereof, with a finder view window 17.

Figure 1:
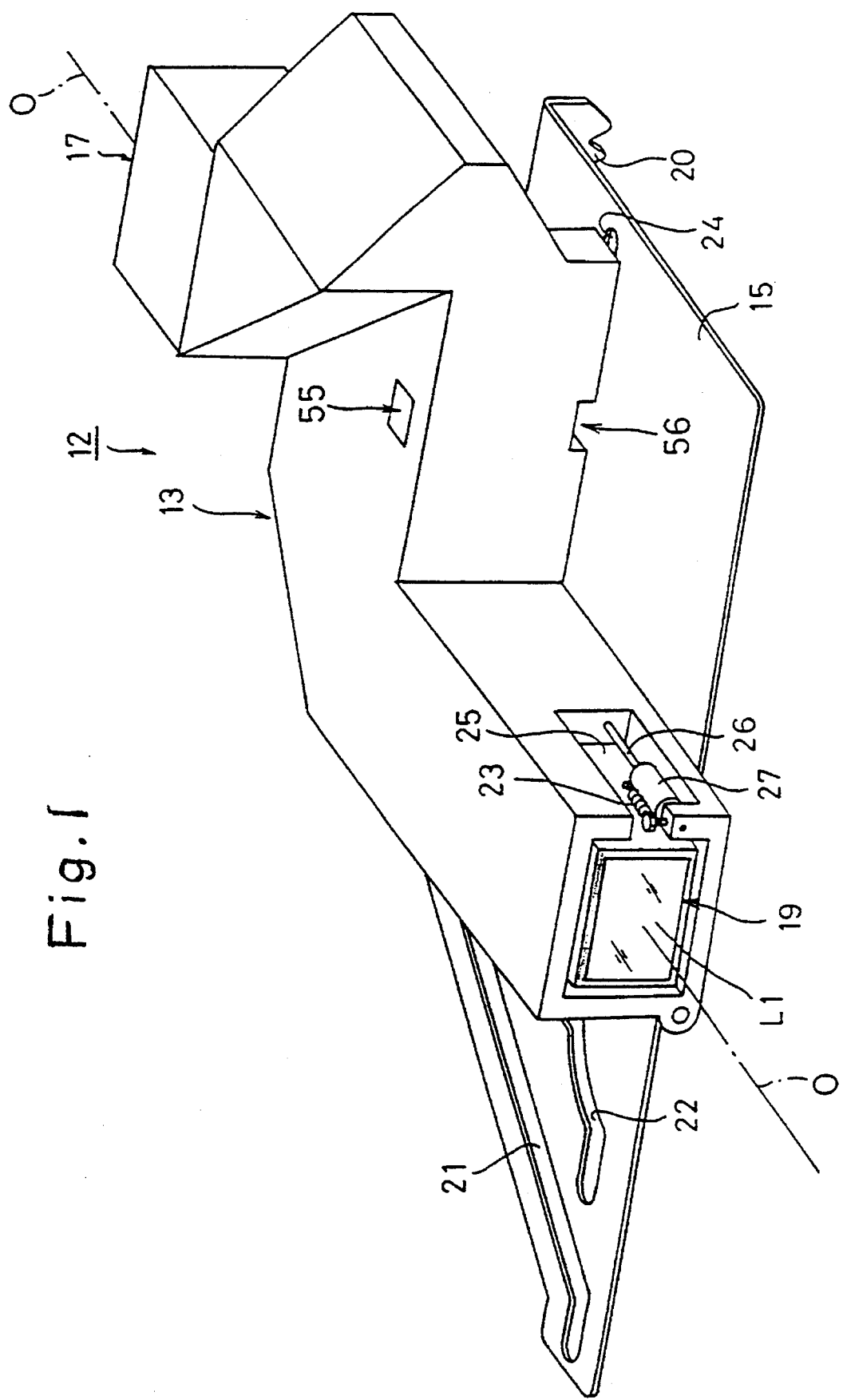
FIG. 1 is a perspective view of a zoom finder according to the present invention.
Figure 2:
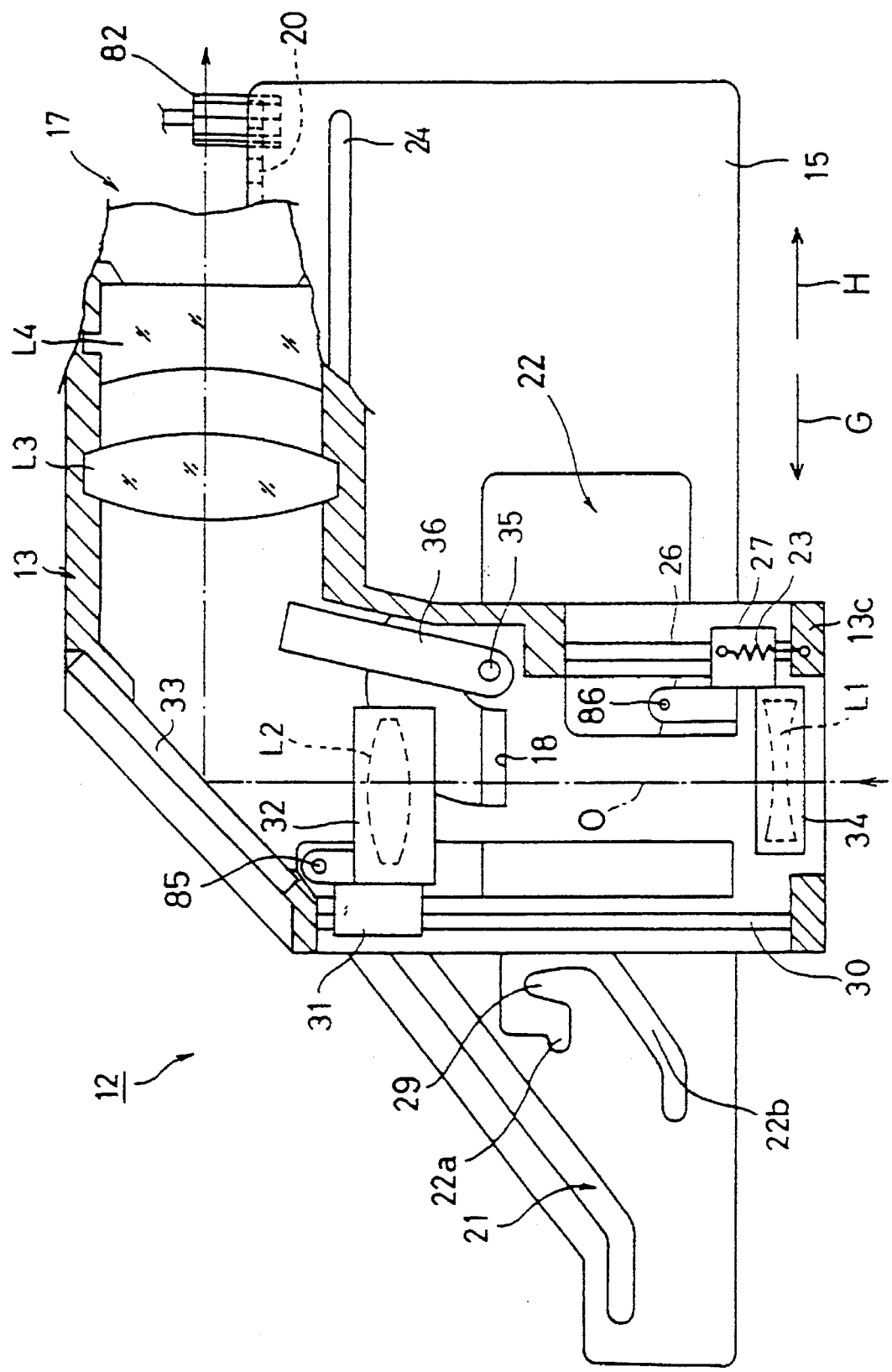
FIG. 2 is a sectional plan view of the zoom finder shown in FIG. 1 when an associated taking lens is in an accommodating section.

In FIG. 1, a real image type zoom finder 12 provided in the camera 10 includes the zoom finder optical system, which is separate from the zoom photographing optical system. The zoom finder 12 is provided with a finder body 13 and a cam plate As can be seen in FIG. 2, the finder body 13 is generally L-shaped in a plan view and includes a first lens assembly L1 (i.e., objective lens assembly), a second lens assembly L2, a third lens assembly L3, a fourth lens assembly L4, a prism (not shown), and a fifth lens assembly L5 (i.e., eyepiece) in this order from the object side. The third, fourth and fifth lens assemblies L3, L4 and L5 are immovable. The third and fifth lens assemblies L3 and L5 have a positive power and the fourth lens assembly L4 has a negative power.

The first and second lens assemblies L1 and L2 are variable power lens assemblies which are moved in relation to each other in the optical axis direction according to a predetermined relationship. The first lens assembly L1 has a negative power and the second lens assembly L2 has a positive power, respectively. The optical path of the first and second lens assemblies L1 and L2 are substantially perpendicular to the optical path of the third and fourth lens assemblies L3 and L4. Between the optical paths a reflecting plate 33 is provided and is inclined at a predetermined angle to bend light transmitted through the first and second lens assemblies L1 and L2 by approximately 90°, so that the light is made incident upon the third, fourth and fifth lens assemblies L3, L4 and L5.

The first lens assembly L1 is held by a first movable lens frame 34 secured to a guide ring 27 so as to move in opposite directions along the optical axis O. The guide ring 27 is movably guided by a guide bar 26 which is provided on one side of the front end of the finder frame 13 and extends in the forward and backward directions of the finder body 13. The guide ring 27 is provided with a tensile spring 23 which is connected at its one end to the guide ring 27 and at the other end to a front end 13c of the finder body 13, so that the guide ring 27 and, accordingly, the first lens assembly L1 are continuously biased forward in the optical axis direction O by the tensile spring 23. The first lens frame 34 is provided with a cam pin 86 which projects downward from the finder body 13 and which is moved by a cam plate 15.

The second lens assembly L2 is held by a second movable lens frame 32 secured to a guide ring 31 so as to move in the optical axis direction O in opposite directions. The guide ring 31 is movably guided by a guide bar 30 which is provided on the other side of the front end of the finder body 13 and extends in the forward and backward directions thereof. The second lens frame 32 is provided with a cam pin 85 which projects downward (i.e., in the direction perpendicular to the sheet of the drawing in FIG. 2) from the finder body 13 and which is moved by the cam plate 15.

Figure 5:
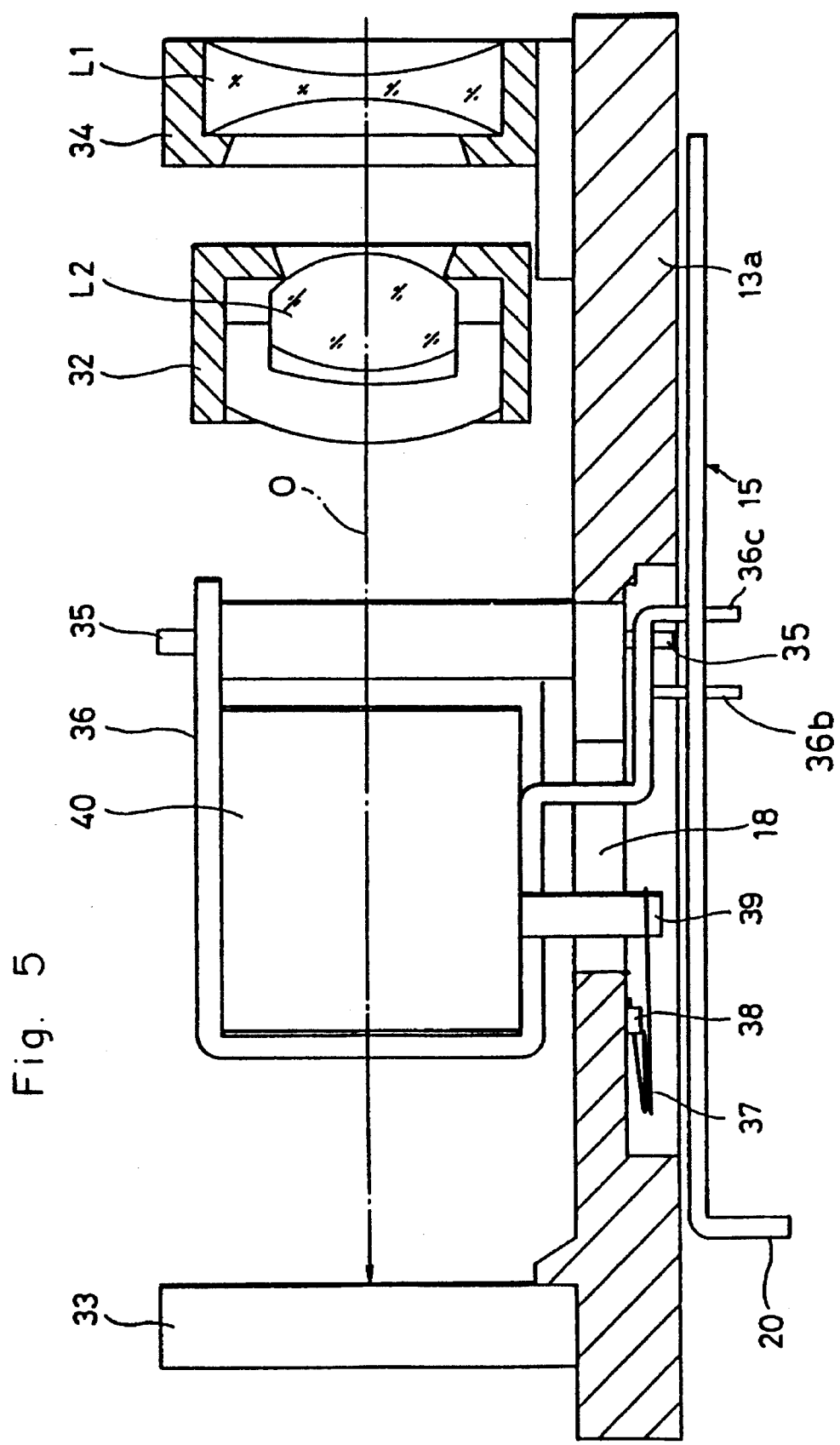
FIG. 5 is an elevated end view of a zoom finder viewed in direction D of FIG. 3.
Figure 6:
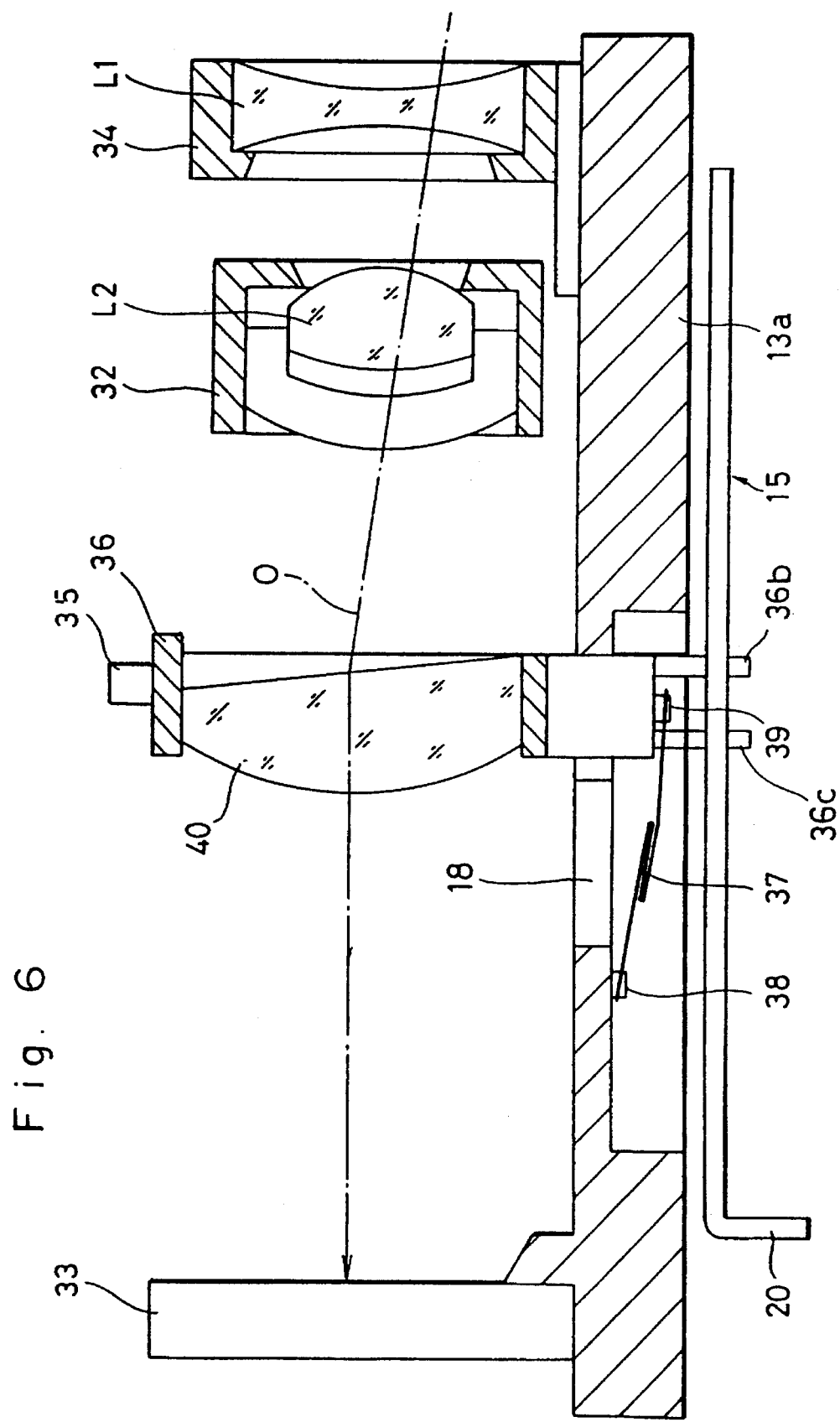
FIG. 6 is an elevated end view of a zoom finder viewed in direction E of FIG. 4.

A prism frame (i.e., parallax error compensating optical member frame) 36 is provided optically behind the guide bar 26 and is rotatable about a pivot shaft 35 which is in turn supported by the finder body 13. A parallax error compensating prism (i.e., a parallax error compensating optical member) 40 is held by the prism frame 36, as can be seen in FIG. 5. Consequently, the parallax error compensating prism 40 is rotatable between a compensating position in which the parallax error compensating prism 40 is in the optical path of the zoom finder optical system and a retracted position in which the parallax error compensating prism 40 is retracted from the optical path of the zoom finder optical system.

The finder body 13 is provided on a lower wall portion 13a thereof with a sectoral guide groove 18 whose profile corresponds to the locus of the rotational movement of the prism frame 36 (i.e., the parallax error compensating prism 40). The prism frame 36 is provided with a spring engaging projection 39 and a pair of engaging fingers 36b and 36c, that project downward (i.e., in the direction perpendicular to the sheet of the drawing in FIG. 7 or 8) from the guide groove 18. The engaging fingers 36b and 36c are angularly spaced from one another by about 90° with respect to the pivot shaft 35, so that when the prism frame 36 is located in the retracted position shown in FIG. 3, the engaging finger 36c is engaged by a switching pawl 29 which is moved in the direction H in FIG. 7.

Figure 3:
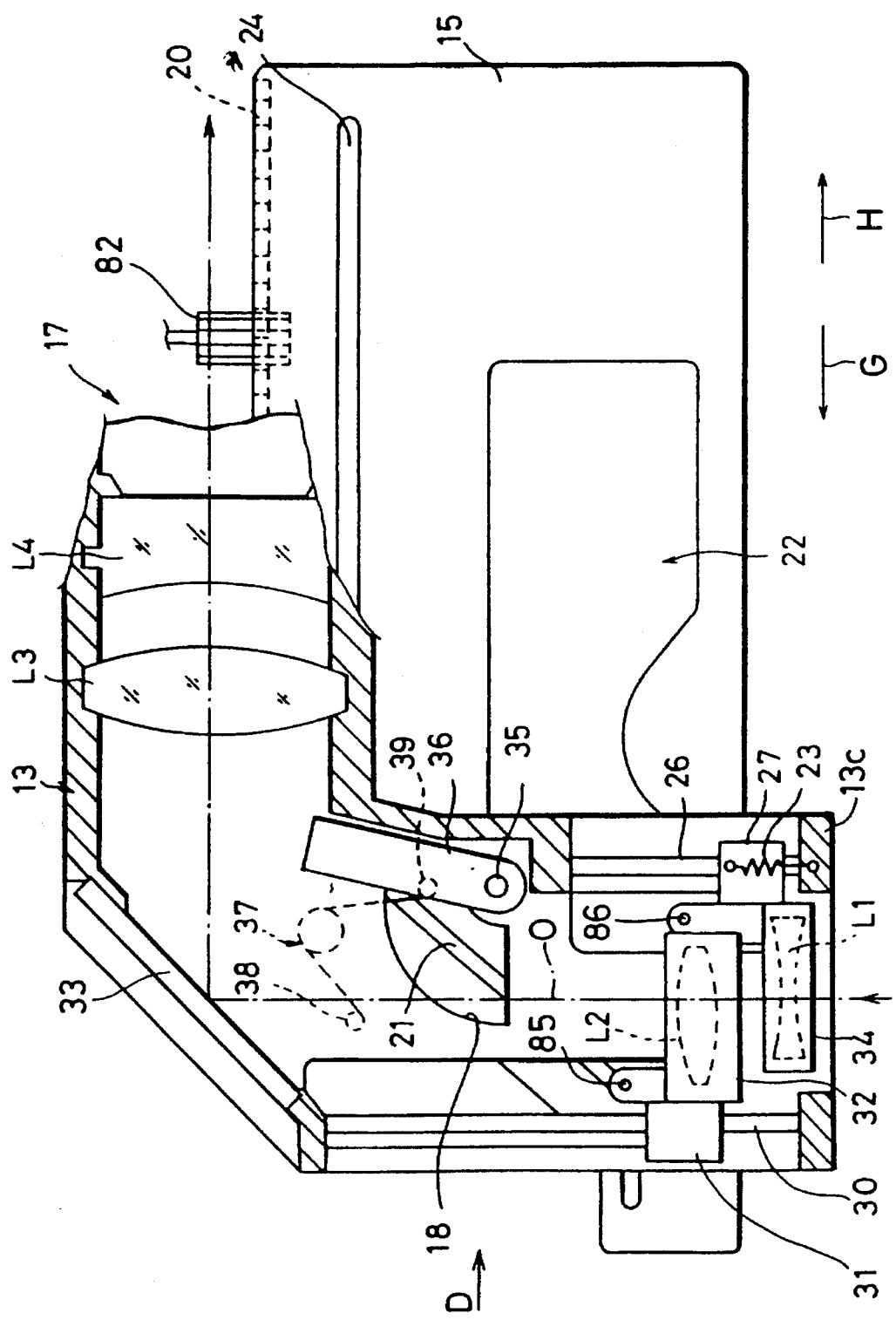
FIG. 3 is a sectional plan view of a zoom finder shown in FIG. 1 in a retracted position in which a parallax error compensating prism is retracted from an optical path of a zoom finder optical system.
Figure 4:
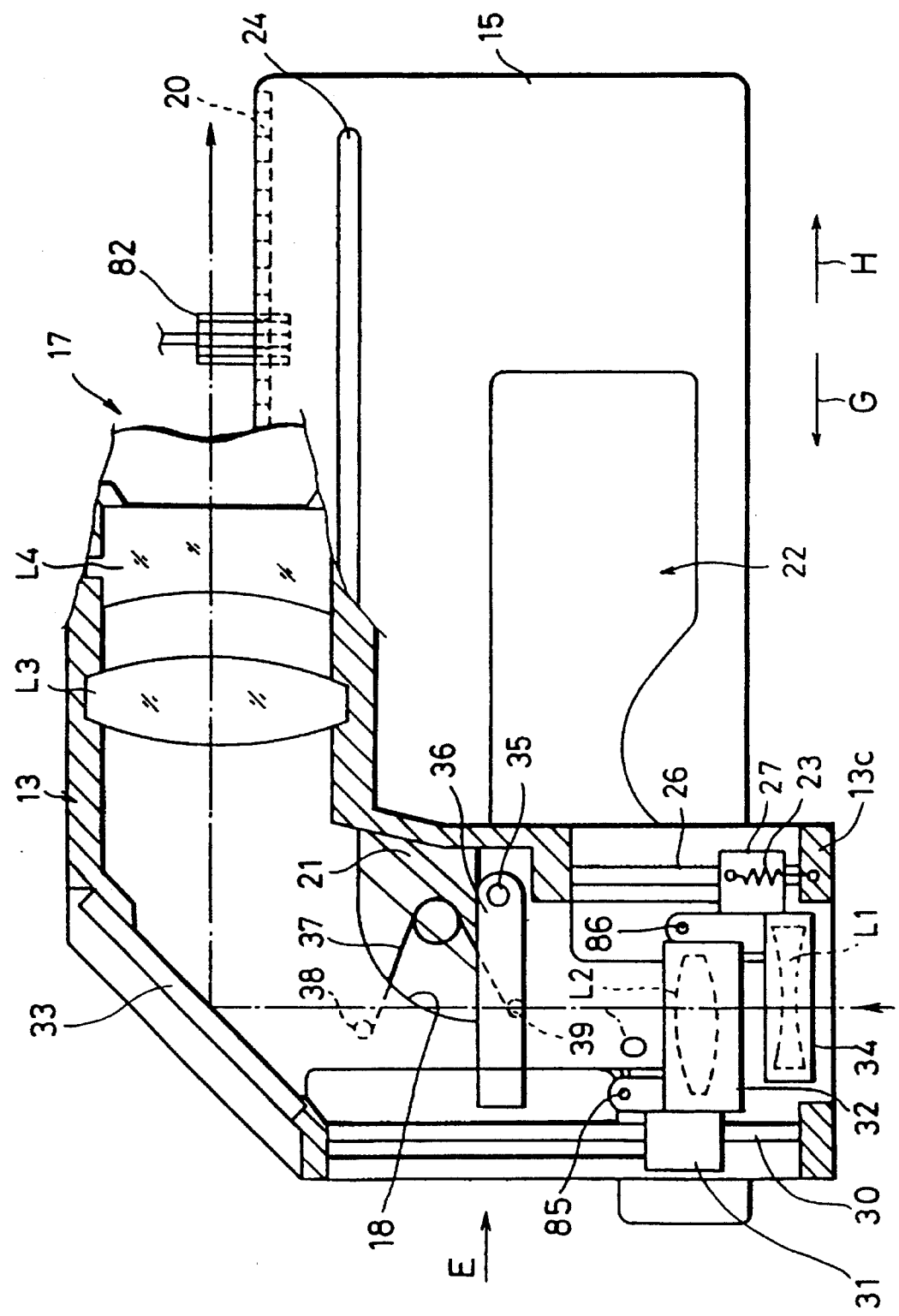
FIG. 4 is a sectional plan view of a zoom finder shown in FIG. 1 in a compensating position in which a parallax error compensating prism is in an optical path of a zoom finder optical system.
Figure 8:
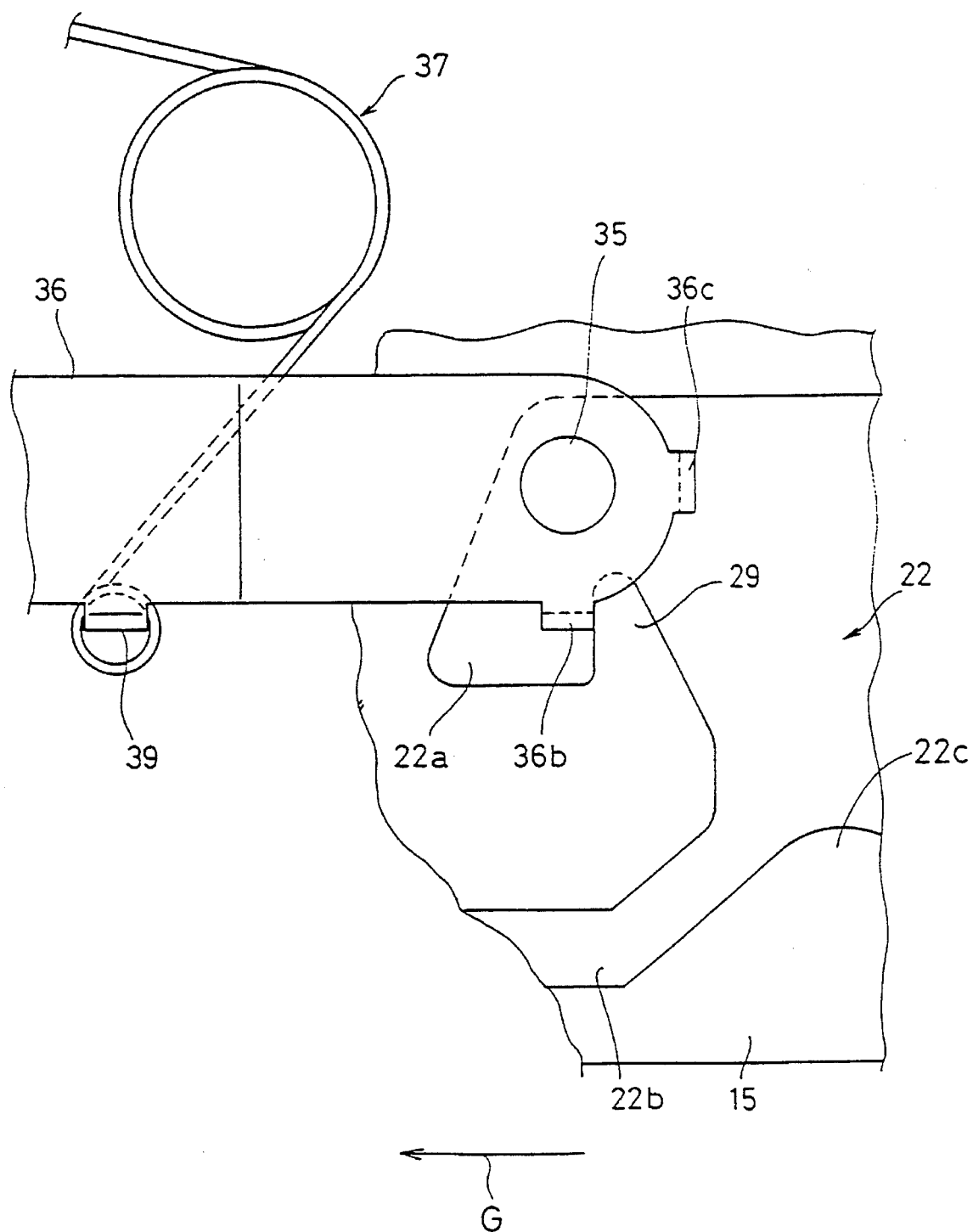
FIG. 8 is an enlarged view of a parallax error compensating prism, which is located in an optical path of a zoom finder optical system, and a switching pawl.

When the prism frame 36 is located in the compensating position shown in FIG. 4, the engaging finger 36b is engaged by the switching pawl 29 which is moved in the direction G in FIG. 8. The prism frame 36 is positioned so that when the engaging fingers 36b and 36c are in the retracted position, the prism frame 36 constitutes a diaphragm for the optical path of the finder optical system (FIGS. 2 and 3).

Referring again to FIG. 5, a first spring engaging projection 38 is provided on the lower wall portion 13a of the finder body 13 on the side opposite to the pivot shaft 35 with respect to the guide groove 18. A second spring engaging projection 39 is angularly moved together with the prism frame 36 within the guide groove 18. A torsion spring 37 is engaged at opposite ends thereof by the first and second spring engaging projections 38 and 39. This constitutes a snap-action mechanism that quickly rotates the prism frame 36 (i.e., parallax error compensating prism 40) to the retracted position or the compensating position, immediately past a point of instability.

Figure 7:
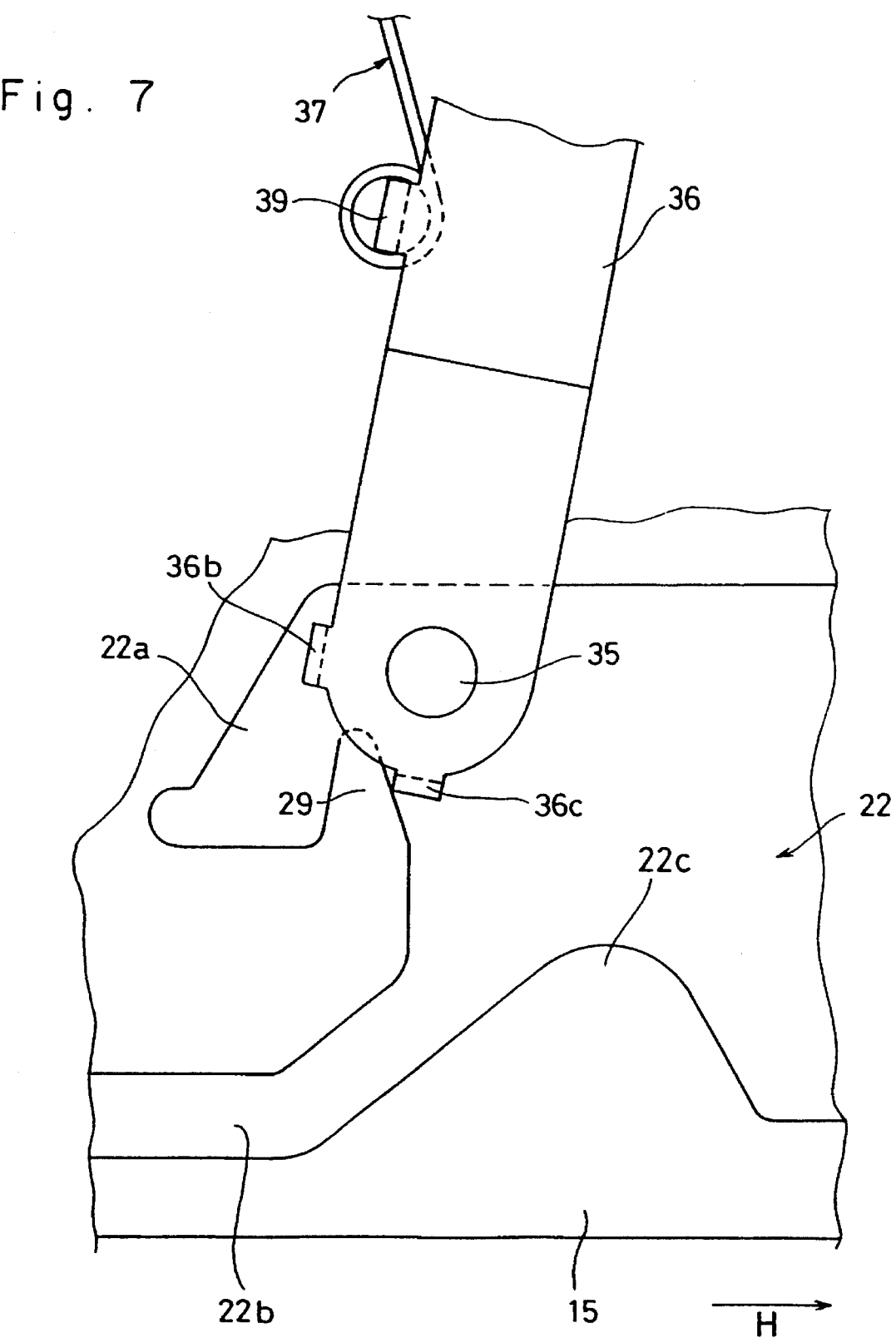
FIG. 7 is an enlarged view of a parallax error compensating prism, which is retracted from an optical path of a zoom finder optical system, and a switching pawl.
Figure 9:
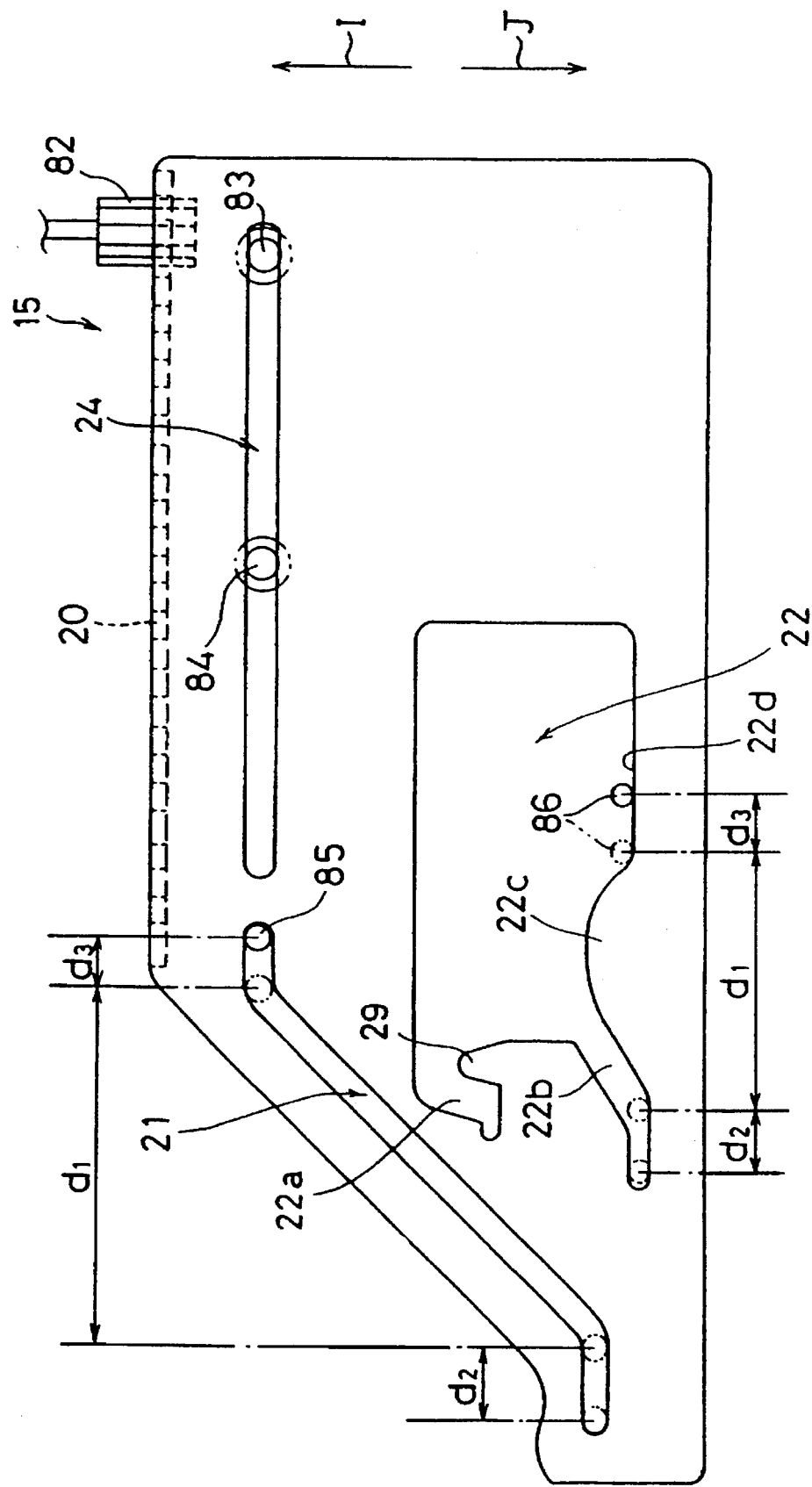
FIG. 9 is a plan view of a single cam plate.

As can be seen in FIG. 9, the switching pawl 29 is integrally provided on the cam plate 15, so that the switching pawl 29 is moved together with the cam plate 15 in opposite directions to apply the rotational force to the prism frame 36 (i.e., parallax error compensating prism 40) towards the point of instability. Consequently, when the macro mode is selected, so that the cam plate 15 is moved towards the macro section (i.e., in direction H in FIG. 3), the engaging finger 36c is engaged by the switching pawl 29, whereby the engaging finger 36c is pressed in the same direction (FIG. 7). As a result, the prism frame 36 is rotated in the counterclockwise direction (FIG. 3) towards the point of instability.

Similarly, when the cam plate 15 is transferred to the zoom photographing section from the macro section (direction G in FIG. 4), the engaging finger 36b is engaged and pressed by the switching pawl 29 in the same direction (FIG. 8). As a result, the prism frame 36 is rotated in the clockwise direction towards the point of instability.

The single cam plate 15 with removed finder body 13 is shown in FIG. 9. The cam plate 15 is provided, on one side thereof adjacent to the eyepiece side (direction I), with a rack 20 which is in mesh with a pinion 82 which is provided on the camera body 9 to rotate in association with the zoom photographing optical system. The cam plate 15 is also provided with a guide groove 24 which extends in parallel with the rack 20. Guide pins 83 and 84 secured to the bottom of the finder body 13 and spaced from one another are movably fitted in the guide groove 24. Consequently, the cam plate 15 is guided to move in the lateral direction of the camera 10 within the effective length of the guide groove 24 in accordance with the engagement of the guide pins 83 and 84 in the guide groove 24.

Also, the cam plate 15 is provided with a cam opening 22 and a cam groove 21 in which a cam pin 85 provided on the second lens frame 32 is fitted. The cam opening 22 is comprised of a cam groove portion 22b, cam portions 22c and 22d, and a receptacle portion 22a. A cam pin 86 of the first lens assembly L1 urged towards the object side by the guide ring 27 is guided in the cam opening 22. The switching pawl 29 of the prism frame 36 which selectively engages with the engaging finger 36b or 36c of the prism frame 36 projects into the receptacle portion 22a. The movable (i.e., rotatable) engaging finger 36b is also fitted in the receptacle portion 22a. The cam groove 21 has a taking lens accommodating section d3 in which the first lens frame 34 (first lens assembly L1) and the second lens frame 32 (second lens assembly L2) can be moved or retained.

The taking lens accommodating section d3 of the cam groove 21 and the taking lens accommodating section d3 of the cam opening 22 are linear sections corresponding to the shortest focal length of the zoom photographing optical system. The zoom section d1 of the cam groove 21 is a linear section which is inclined at a predetermined angle with respect to the taking lens accommodating section d3 of the cam groove 21. The zoom section d1 of the cam portion 22c of the cam opening 22 is defined by an oblique or curved profile which corresponds to the inclined zoom section d1 of the cam groove 21. The zoom section d1 of the cam groove 21 and zoom section d1 of the cam opening 22 are for moving the first and second lens assemblies L1 and L2 along the optical axis O, respectively, to vary the magnification thereof in accordance with the magnification of the zoom photographing optical system.

The macro section d2 of the cam groove 21 and the macro section d2 of the cam opening 22 are linear sections, similar to the taking lens accommodating sections d3. When the first and second lens assemblies L1 and L2 are located at the telephoto extremity in the macro sections d2, if the switching pawl 29 is forced against the engaging finger 36c. (FIG. 7), the prism frame 36 can be rotated in the counterclockwise direction towards a position shown in FIG. 4.

The rack 20, the cam groove 21, the cam opening 22, the guide groove 24, and the switching pawl 29, of the cam plate 15 can be all integrally formed by a press machining per se known.

In the zoom finder as constructed above, according to the present invention, when the cam pins 85 and 86 are moved to the respective taking lens accommodating sections d3 in association with the drive of the zoom photographing optical system, so that the zoom finder optical system is located at the wide angle extremity, as can be seen in FIG. 2, the first and second lens assemblies L1 and L2 are spaced farthest from one another. In this state, the prism frame 36 is rotated about the pivot shaft 35 to come to the retracted position.

When the zoom photographing optical system is moved to the zoom section, the pinion 82 which is rotated in association therewith moves the cam plate 15 in the direction H in FIG. 2 through the rack 20 which is in mesh with the pinion 82. Consequently, cam pin 85 is moved towards the object side (direction J) within the zoom section d1, while being guided by the cam groove 21, and the cam pin 86 is guided by the cam portion 22c to once move towards the eyepiece side (direction I) and then move towards the object side (direction J) again (FIG. 3).

As can be understood from the foregoing, since the first and second lens assemblies L1 and L2 that are variable power lens assemblies are moved in the optical axis direction O while keeping a predetermined relationship, the power (magnification) of the zoom finder optical system can be varied in accordance with the magnification of the zoom photographing optical system.

Upon transfer to the macro section d2, when a further movement of the cam plate 15 occurs in the direction H in FIG. 3, the switching pawl 29 of the cam plate 15 comes into engagement with the engaging finger 36c of the prism frame 36 to press the same in the direction H at the telephoto extremity at which the first and second lens assemblies L1 and L2 are located (FIG. 7).

Consequently, the prism frame 36 is quickly rotated in the counterclockwise direction in FIG. 3 by the snap-action mechanism as soon as it passes the point of instability, as mentioned above, so that the parallax error compensating prism 40 is moved to and stably held in the compensating position shown in FIG. 4.

Upon transfer to the zoom section d1 from the macro section d2, when the cam plate 15 is moved in the direction G in FIG. 4, the switching pawl 29 of the cam plate 15 is engaged by the engaging finger 36b of the prism frame 36 to press the same in the direction G (FIG. 8). Consequently, the fast or accelerated rotation of the prism frame 36 in the clockwise direction in FIG. 4 takes place through the snap-action mechanism immediately past the point of instability. Hence, the parallax error compensating prism 40 is quickly rotated to and stably held in the retracted position shown in FIG. 3.

Thus, according to the above embodiment to which the present invention is applied, since the parallax error compensating prism 40 is switched between the compensating position and the retracted position through the snap-action mechanism, the switching operation can be more quickly effected than the prior art in which the parallax error compensating optical member was switched by a cam groove, as mentioned above. Accordingly, a photographer who is observing an object to be taken through the view window of the view finder would not be disrupted due to the presence of the parallax error compensating prism within the view window during transfer to the macro mode from the standard mode and vice versa.

Furthermore, since the parallax error compensating prism 40 is directly actuated by the switching pawl 29 formed on the cam plate 15, not only can the structure of the view finder be simplified but also the number of the indispensable components thereof can be reduced in comparison with the prior art in which the parallax error compensating optical member was moved through an actuator.

Although the invention has been described with reference to particular means, materials and embodiments, it is to be understood that the invention is not limited to the particulars disclosed and extends to all equivalents within the scope of the claims.

I claim:

1. A zoom finder of a camera comprising:

a variable power zoom finder optical system;

a cam plate linearly movable within a plane of said cam plate, said cam plate being provided with a switching pawl;

a light-refracting, parallax error compensating optical member having a rotating axis which is perpendicular to the plane in which said cam plate moves, said parallax error compensating optical member being rotatable between a retracted position, in which said parallax error compensating optical member is retracted from an optical path of said optical system and a compensating position, in which said parallax error compensating optical member is in said optical path, and compensates for parallax error by refracting light;

said parallax error compensating optical member being provided with a pair of engaging fingers which engage with said switching pawl to rotate said parallax error compensating optical member into and out of said optical path in association with linear movement of said cam plate; and a snap action mechanism having a torsion spring, wherein an immediate rotation of said parallax error compensating optical member occurs between said compensating position and said retracted position when said parallax error compensating optical member moves beyond a point of instability of said torsion spring in a direction of said compensating position and said retracted position, respectively.

2. The zoom finder of claim 1, wherein said camera comprises:

a zoom photographing optical system, and a pinion which is interlocked with said zoom photographing optical system and moves in response to a zooming operation of said zoom photographing optical system.

3. The zoom finder of claim 2, wherein said cam plate further comprises:

a rack which is engaged with said pinion, said cam plate being linearly movable in opposite directions in association with rotation of said pinion.

4. The zoom finder of claim 1, wherein said zoom finder optical system comprises:

a plurality of movable variable power lens groups which move in relation to one another in an optical axis direction to effect a zooming operation.

5. The zoom finder of claim 4, wherein said cam plate is further provided with a cam groove having a zooming range for moving said plurality of movable variable power lens groups to effect said zooming operation, and a macro range for stopping said plurality of movable variable power lens groups according to a predetermined relationship, and wherein said parallax error compensating optical member is positioned in said compensating position at said macro range.

6. The zoom finder of claim 1, wherein said switching member is a switching pawl integrally formed on said cam plate.

7. The zoom finder of claim 6, wherein said switching pawl is formed by press machining.

8. The zoom finder of claim 1, wherein said parallax error compensating optical member is a prism.

9. The zoom finder of claim 8, wherein said parallax error compensating optical member includes a holder which supports said prism.

10. The zoom finder of claim 1, further comprising:

a finder body in which said parallax error compensating optical member is housed.

11. The zoom finder of claim 10, wherein said torsion spring is engaged at opposite ends thereof with first and second spring engaging projections provided on said finder body and said parallax error compensating optical member, respectively.

12. The zoom finder of claim 1, wherein said parallax error compensating optical member constitutes a diaphragm for said optical path of said zoom finder optical system when said parallax error compensating optical member is in said retracted position.

13. A zoom finder of a camera, comprising:

a variable power zoom finder optical system;

a cam plate that is linearly movable in opposite directions in a plane of said cam plate;

a frame that is rotatable between a retracted position, in which said frame is retracted from an optical path of said optical system, and a compensating position, in which said frame is in said optical path, said frame having a rotating axis which is perpendicular to the plane in which said cam plate moves;

said cam plate rotating said frame into said compensation position when said camera is adjusted to a macro mode;

a light-refracting, optical member that is supported by said frame, said optical member compensating for a parallax error between said zoom finder and a lens of said camera by refracting light when said light-refracting optical member is rotated into said compensating position; and a snap-action mechanism having a torsion spring, wherein an immediate rotation of said frame occurs between said compensating position and said retracted position when said frame moves beyond a point of instability of said torsion spring in a direction of said compensating position and said retracted position, respectively.

14. The zoom finder of a camera according to claim 13, said light refracting, parallax error compensating optical member comprising a prism.

15. A zoom finder of a camera comprising:

a variable power zoom finder optical system;

a light-refracting, parallax error compensating optical member that is movable between a retracted position, in which said parallax error compensating optical member is retracted from an optical path of said optical system, and a compensating position, in which said parallax error compensating optical member is in said optical path, and compensates for parallax error by refracting light, said parallax error compensating optical member being rotated from said retracted position to said compensating position upon transfer to a macro mode of said camera;

a cam plate movable within a plane, said parallax error compensating optical member moving between said retracted and compensating positions in association with movement of said cam plate;

a snap-action mechanism having a torsion spring, wherein an immediate movement of said parallax error compensating optical member occurs between said compensating position and said retracted position when said parallax error compensating optical member moves beyond a point of instability of said torsion spring in a direction of said compensating position and said retracted position, respectively.

16. The zoom finder of a camera according claim 15, said light refracting, parallax error compensating optical member comprising a prism.

17. A zoom finder of a camera comprising:

a variable power zoom finder optical system;

a cam plate linearly movable within a plane of said cam plate;

a switching pawl formed on said cam plate, said switching pawl extending within the plane of said cam plate;

a light-refracting, parallax error compensating optical member rotatable between a retracted position, in which said parallax error compensating optical member is retracted from an optical path of said optical system and a compensating position, in which said parallax error compensating optical member is in said optical path; and compensates for parallax error by refracting light; and a snap action mechanism having a torsion spring, wherein an immediate movement of said parallax error compensating optical member occurs between said compensating position and said retracted position, when said parallax error compensating optical member moves beyond a point of instability of said torsion spring in a direction of said compensation position and of said retracted position, respectively.

18. The zoom finder of claim 17, wherein said parallax error compensating optical member is provided with a pair of engaging fingers which engage with said switching pawl to rotate said parallax error compensating optical member into and out of said optical path by a linear movement of said cam plate; said parallax error compensating optical member has a rotating axis which is transverse to the plane of said cam plate.

19. The zoom finder of claim 17, said switching pawl defined by a peripheral portion of an opening within said cam plate.

20. The zoom finder of claim 17, said parallax error compensating optical member having a rotation axis extending transverse to a plane of said came plate.

21. The zoom finder of a camera according to claim 17, said light refracting, parallax error compensation optical member comprising a prism.

* * * * *